United States Patent
Lee et al.

(10) Patent No.: US 10,017,385 B2
(45) Date of Patent: Jul. 10, 2018

(54) CATALYST COMPOSITION AND METHOD FOR PRODUCING HYDROGEN AND PREPARATION METHOD THEREOF

(71) Applicant: National Chiao Tung University, Hsinchu (TW)

(72) Inventors: Chi-Shen Lee, Hsinchu (TW); Yuan-Chia Chang, Hsinchu (TW); Ho-Chen Hsieh, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 0 days.

(21) Appl. No.: 15/205,045

(22) Filed: Jul. 8, 2016

(65) Prior Publication Data
US 2017/0152138 A1 Jun. 1, 2017

(30) Foreign Application Priority Data
Nov. 26, 2015 (TW) .............................. 104139376 A

(51) Int. Cl.
*B01J 21/06* (2006.01)
*B01J 23/02* (2006.01)
(Continued)

(52) U.S. Cl.
CPC ............. *C01B 3/326* (2013.01); *B01J 21/066* (2013.01); *B01J 23/002* (2013.01); *B01J 23/10* (2013.01);
(Continued)

(58) Field of Classification Search
CPC ........ B01J 21/063; B01J 21/066; B01J 23/02; B01J 23/04; B01J 23/10; B01J 23/40; B01J 23/42; B01J 23/44; B01J 23/46; B01J 23/56; B01J 23/58; B01J 23/63; B01J 23/70; B01J 23/72; B01J 23/74; B01J 23/78; B01J 23/83; B01J 23/89; B01J 23/8906; B01J 23/8913; B01J 23/892;
(Continued)

(56) References Cited

U.S. PATENT DOCUMENTS 3,972,837 A * 8/1976 Acres .................... B01D 53/945
  423/213.5
4,089,810 A * 5/1978 Diwell ................. B01D 53/945
  423/213.5

(Continued)

FOREIGN PATENT DOCUMENTS

CN 104971727 A 10/2015

OTHER PUBLICATIONS

J. Bussi et al., "Catalytic transformation of ethanol into acetone using copper-pyrochlore catalysts," Applied Catalysis A: General, v. 172, 1998, p. 117-129.

*Primary Examiner* — Cam N Nguyen
(74) *Attorney, Agent, or Firm* — Mintz Levin Cohn Ferris Glovsky and Popeo, P.C.; Peter F. Corless

(57) ABSTRACT

The present invention provides a catalyst composition for producing hydrogen and preparation method and use thereof, wherein the catalyst composition comprises a catalytic component and a supporter having a pyrochlore structure. By using the catalyst composition of the present invention, carbon deposition can be reduced and the oxidative steam reforming of ethanol could be operated for a long period of time with high ethanol conversion rate and selectivity of hydrogen.

19 Claims, 8 Drawing Sheets

(51) Int. Cl.
*B01J 23/04* (2006.01)
*B01J 23/10* (2006.01)
*B01J 23/40* (2006.01)
*B01J 23/42* (2006.01)
*B01J 23/44* (2006.01)
*B01J 23/46* (2006.01)
*B01J 23/56* (2006.01)
*B01J 23/58* (2006.01)
*B01J 23/63* (2006.01)
*B01J 23/70* (2006.01)
*B01J 23/72* (2006.01)
*B01J 23/74* (2006.01)
*B01J 23/78* (2006.01)
*B01J 23/83* (2006.01)
*B01J 23/89* (2006.01)
*B01J 37/02* (2006.01)
*B01J 37/03* (2006.01)
*B01J 37/04* (2006.01)
*C01B 3/32* (2006.01)
*B01J 23/00* (2006.01)

(52) U.S. Cl.
CPC ............... *B01J 23/63* (2013.01); *B01J 23/83* (2013.01); *B01J 37/0201* (2013.01); *B01J 37/0203* (2013.01); *B01J 37/036* (2013.01); *B01J 37/04* (2013.01); *B01J 2523/00* (2013.01); *C01B 2203/0233* (2013.01); *C01B 2203/1058* (2013.01); *C01B 2203/1064* (2013.01); *C01B 2203/1082* (2013.01); *C01B 2203/1229* (2013.01)

(58) Field of Classification Search
CPC .. B01J 23/8926; B01J 23/894; B01J 23/8946; B01J 37/0201; B01J 37/0203; B01J 37/036; B01J 37/04; C01B 3/326
See application file for complete search history.

(56) References Cited

U.S. PATENT DOCUMENTS

| | | | | |
|---|---|---|---|---|
| 4,225,469 A | * | 9/1980 | Horowitz | C01G 55/00 252/519.13 |
| 4,957,718 A | * | 9/1990 | Yoo | B01D 53/8609 208/113 |
| 5,015,461 A | * | 5/1991 | Jacobson | B01J 23/005 423/593.1 |
| 5,105,053 A | * | 4/1992 | Jacobson | B01J 23/005 502/324 |
| 5,135,862 A | * | 8/1992 | Kaper | A61K 39/107 435/252.3 |
| 6,458,741 B1 | * | 10/2002 | Roark | A62D 3/38 423/245.3 |
| 6,534,031 B2 | * | 3/2003 | Bedard | B01J 39/10 423/593.1 |
| 6,534,670 B2 | * | 3/2003 | Yoshisato | B01J 23/002 502/302 |
| 6,787,118 B2 | * | 9/2004 | Roark | A62D 3/38 422/177 |

* cited by examiner

CATALYST COMPOSITION AND METHOD FOR PRODUCING HYDROGEN AND PREPARATION METHOD THEREOF

CROSS-REFERENCE TO RELATED APPLICATION

This application claims under 35 U.S.C. § 119(a) the benefit of Taiwanese Patent Application No. 104139376 filed Nov. 26, 2015, the entire contents of which are incorporated herein by reference.

BACKGROUND OF THE INVENTION

1. Field of the Invention

This disclosure relates to catalyst compositions for producing hydrogen. More specifically, this disclosure relates to a catalyst composition for oxidative steam reformation of ethanol for producing hydrogen and the preparation method of the catalyst composition.

2. Description of Related Art

Energy is indispensable in our daily life. About 80% of energy relies on combustion of fossil fuels which will not last forever. Carbon dioxide and greenhouse gases generated during energy generation result in the risk of global warming. To solve the issue of environmental pollution, it is urgent to find a renewable, clean and sustainable new energy to replace the fossil fuels.

Hydrogen is an excellent energy source because it is an alternative energy with high electrical energy conversion efficiency. The quantity of heat energy generated from combustion of per kilogram of hydrogen is about 3 times of that of gasoline and 4.5 times of that of coke. The product of reacting hydrogen with oxygen is produced in the form of water with low-pollution to the environment. However, the volumetric energy density of hydrogen is low. To increase the energy density per volume unit, biofuels can be used to produce hydrogen. Furthermore, expensive transportation cost of hydrogen leads scientists to choose appropriate hydrogen sources as fuels of the new energy sources. At present, alternative hydrogen sources including hydrocarbon compounds such as methanol, ethanol, natural gas and light oil are used in majority. Among these, ethanol has many advantages such as higher fuel quality, cheaper price, easy access, easy storage, easy portability and higher energy density. Furthermore, ethanol can produce hydrogen at lower reaction temperature. As compared to the conventional gasoline fuel, the generated carbon dioxide is reduced by approximately 50% and the air pollutant such as nitrogen oxide, sulfur oxide and hydrocarbon compound is not produced.

Current technologies for converting ethanol into hydrogen include steam reforming of ethanol (SRE), partial oxidation of ethanol (POE), oxidative steam reforming of ethanol (OSRE) and others. Over the past decade, scientists have focused on the research that SRE can be operated at lower temperature. The chemical reaction equation for SRE is as follows.

$$C_2H_5OH + 3H_2O \rightarrow 2CO_2 + 6H_2 \quad \Delta H^\circ_{298} = +347.4 \text{ kJ/mol}$$

The SRE reaction belongs to a reaction having highest yield of hydrogen. However, since SRE is an endothermic reaction, the operation temperature is still high. In contrast, OSRE is an exothermic reaction and can react at relatively lower temperature, so it has become the research emphasis in the industry. The chemical reaction equation for OSRE is as follows.

$$C_2H_5OH + \tfrac{1}{2}O_2 + 2H_2O \rightarrow 2CO_2 + 5H_2 \quad \Delta H_R = -68 \text{ kJ/mol}$$

In another aspect, according to previous studies, noble metals with high activities are used as catalytic active components for the catalytic reaction of hydrogen. The noble metals include rhodium (Rh), ruthenium (Ru), platinum (Pt), palladium (Pd), iridium (Ir) and the like. Because of relatively higher cost of the noble metals, alternative metals, such as iron (Fe), cobalt (Co), nickel (Ni), and copper (Cu), are used as catalytic active components to reduce cost.

However, these catalytic active components adsorb on normal supporters like $\gamma\text{-}Al_2O_3$, $SiO_2$, $ZrO_2$, MgO and $TiO_2$ with higher temperature of the conversion reaction of the catalyst composition which increases the breakage of carbon-carbon bonds as well as generates the depositions of carbon byproduct. It results in the loss of the activity of catalyst composition with reduced usable-life which results in the issues of cost reduction.

Hence, it is urgent to develop a catalyst composition with high energy conversion rate, reduced carbon deposition, and prolonged usable-life.

SUMMARY OF THE INVENTION

This disclosure provides a catalyst composition for producing hydrogen. The catalyst composition may include a catalytic active component, and a supporter on which the catalytic active component is formed and represented by formula (I), $$A_2B_2O_7 \tag{I}$$

wherein A is an element selected from the group consisting of alkaline earth metals and Group IIIB transition metals, and B is an element selected from Group IVB.

This disclosure further provides a preparation method of the catalyst composition for producing hydrogen. The method may include mixing a supporter represented by formula (I) with a catalytic active component or a metal precursor having a metal element with catalytic activity in presence of solvent, and removing the solvent subsequently.

In an embodiment, the catalytic active component is a metal solid solution represented by formula (II), $$M_{2-x}M'_x(Ce_yN_{2-y})O_{7-\delta} \tag{II}$$

wherein M is an element selected from Group IIIB metals; M' is an element selected from the group consisting of alkali metals, alkaline earth metals and Group IIIB metals, and M is different from M'; N is a transition metal and is exclusive from a Group IIIB metal or lanthanides; x is 0.1 to 1.0; y is 1.8 to 1.9; and δ is greater than 0 to 0.5.

In an embodiment, the catalytic active component is a metal solid solution represented by formula (III), $$P_2(Q_{2-z}Ru_z)O_7 \tag{III}$$

wherein P is an element selected from the group consisting of scandium (Sc), yttrium (Y) and lanthanum (La); Q is an element selected from the group consisting of titanium (Ti), zirconium (Zr) and cerium (Ce); and z is $0 \leq z \leq 0.4$.

In an embodiment, the catalytic active component is a metal solid solution represented by formula (IV), $$La_2(C_{2-\mu}D_\mu)O_{7-1.5\mu} \tag{IV}$$

wherein C is an element selected from the group consisting of Ti, Zr and Ce; D is an element selected from the group consisting of Co, Ni and Cu; and μ is $0 \leq \mu \leq 0.9$.

In addition, this disclosure further provides a use of the catalyst composition for producing hydrogen by oxidative steam reforming of ethanol.

This disclosure provides a catalyst composition including a supporter with the pyrochlore structure to carry other catalytic active components for producing hydrogen to achieve the goal of reducing carbon deposition. Thus, the catalyst composition has stability for prolonged use and enables the ethanol oxidative reformation to have high ethanol conversion rate and hydrogen selectivity.

DETAILED DESCRIPTION

Figure 1:
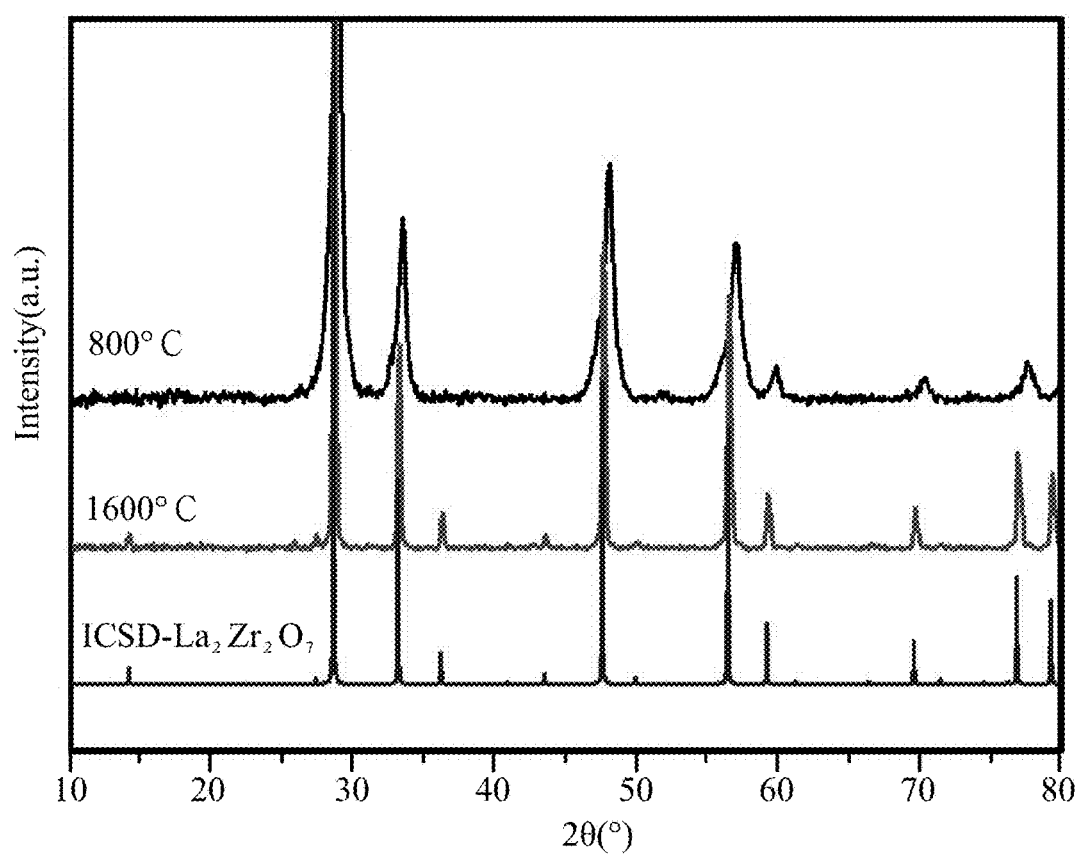
FIG. 1 shows good stability of supporter $La_2Zr_2O_7$ at high temperature.

The following specific examples are used for illustrating the present invention. A person skilled in the art can easily conceive the other advantages and effects of the present invention.

This disclosure provides the development of a catalyst composition including a supporter with the pyrochlore structure, such as $A_2B_2O_7$, to carry catalytic active components. The catalyst composition enables the oxidative steam reforming of ethanol in producing hydrogen to have high ethanol conversion rate and hydrogen selectivity for a long term reaction in fulfilling the industrial demands The catalyst composition prepared according to the method of the present disclosure may include a catalytic active component and a supporter on which the catalytic active component is formed and represented by formula (I):

$$A_2B_2O_7 \qquad (I)$$

wherein A is an element selected from the group consisting of alkaline earth metals and Group IIIB transition metals, and B is an element selected from Group IVB metals.

In one embodiment, A is the element selected from the group consisting of calcium (Ca), strontium (Sr), barium (Ba), scandium (Sc), yttrium (Y), lanthanum (La), cerium (Ce), neodymium (Nd), samarium (Sm), gadolinium (Gd), and dysprosium (Dy); and B is the element selected from the group consisting of Titanium (Ti), Zirconium (Zr) and Hafnium (Hf).

The supporter of the catalyst composition for producing hydrogen of the present disclosure can be prepared in accordance with Pechini sol-gel method. Specifically, the preparation method may include: dissolving a first metal precursor and a second metal precursor in deionized water, and adding an organic acid and an organic solvent with specific molar ratio, and stirring to form colloidal mixture, wherein any one of the first metal precursor and the second metal precursor can be metal salts, metal hydrates or metal chlorides, and wherein the metal of the first metal precursor is selected from the group consisting of alkaline earth metals and Group IIIB transition metals, and the second metal of the second metal precursor is the element selected from Group IVB metals.

In the aforementioned method, the examples of the organic acid may include but not limit to tartaric acid, gluconic acid or citric acid.

In the aforementioned method, the examples of the organic solvent may include but not limit to alcohols which can be selected from the group consisting of methanol, ethanol, butanol, glycol and isopropanol.

The organic solvent in the colloidal mixture is removed at 350° C., and is calcined for 1 to 7 hours, preferably 5 hours, to obtain the nano-powder with pyrochlore structure, wherein the calcination temperature is 600° C. to 900° C.

After that, disc-shaped pellets are made by mixing a pore forming agent with the nano-powder evenly by applying pressure. Subsequently, the disc-shaped pellets are calcined for 1 to 5 hours, preferably 1 hour, to obtain the supporter by percussion and sieving, wherein the calcination temperature is 1200° C. to 1600° C., preferably 1600° C. According to the above method, the pore forming agent can be polyvinyl alcohol (PVA) or polyvinyl butyral (PVB), which accounts for 5 to 10 wt %, that is, adding 5 to 10 grams pore forming agent based on 100 grams nano-powder.

In addition, in one embodiment, A is the element selected from the group consisting of Sc, Y and La, and B is the element selected from the group consisting of Ti, Zr and Hf.

In one embodiment, A is La, and B is Zr.

The catalytic active component prepared according to the method of the present disclosure is a metal solid solution represented by formula (II):

$$M_{2-x}M'_x(Ce_yN_{2-y})O_{7-\delta} \qquad (II)$$

wherein M is an element selected from Group IIIB metals; M' is an element selected from the group consisting of alkali metals, alkaline earth metals and Group IIIB metals, and M is different from M'; N is a transition metal, and is exclusive from a Group IIIB metal or lanthanides; x is 0.1 to 1.0; y is 1.8 to 1.9; and δ is greater than 0 to 0.5.

In one embodiment, M is the element selected from the group consisting of Sc, Y and La, and M' is the element selected from the group consisting of alkali metals, alkaline earth metals, Sc, Y and La.

In one embodiment, N is an element selected from the group consisting of Ru, osmium (Os), Rh, Ir and rhenium (Re).

In another embodiment, M is La, M' is lithium (Li), and N is Ru.

In yet another embodiment, M is La, M' is magnesium (Mg) or Ca, and N is Ru.

In another embodiment, M is Y, M' is Sc, and N is Ru.

The catalytic active component (II) of the catalyst composition of the present disclosure for producing hydrogen also can be prepared to form a metal solid solution in accordance with sol-gel method. First of all, a first metal source, a second metal source, a third metal source and cerium source are added into an organic solvent containing a surfactant. Subsequently, stirring the organic solvent to form a colloidal mixture, wherein a metal of the first metal source is an element selected from the group consisting of alkaline metal, alkaline earth metals and Group IIIB metals; a metal of the second metal source is an element selected from Group IIIB metals, the first metal source is different from the second metal source, and a metal of the third metal source is a transition metal and is exclusive from a Group IIIB metal and lanthanides.

In the aforementioned method, the amount of the surfactant is not specifically limited. In one embodiment, relative to 5 grams (g) of the organic solvent, the amount of the surfactant is from 0.25 to 1.0 g, preferably 0.5 g. The example of the surfactant includes, but is not limited to, P123, F68, F108 and F127. Among these, the chemical formula of P123 is $HO(CH_2CH_2O)_{20}(CH_2CH(CH_3)O)_{70}(CH_2CH_2O)_{20}H$. The organic solvent belongs to alcohols which can be selected from the group consisting of methanol, ethanol, butanol and isopropanol.

According to the above method, the first metal source, the second metal source, the third metal source and the cerium source are added into the organic solvent based on the weighed metal nitrates or metal chlorides at different stoichiometry ratio, and the total concentration of the metal ions contained in the formed mixture is about 5 mmol. After stirring, a colloidal mixture is formed. In one embodiment, after stirring for at least 1 hour, the mixture is gelled at 40° C. for three days consecutively to form the colloidal mixture.

After that, a calcination step is operated according to the conventional method. In a non-limited embodiment, the colloidal mixture is calcined for 1 to 7 hours, preferably 5 hours, to form a metal solid solution, wherein the calcination temperature is from 600° C. to 900° C. In another embodiment, the catalytic active component is a metal solid solution represented by formula (III)

$$P_2(Q_{2-z}Ru_z)O_7 \quad (III)$$

wherein P is an element selected from the group consisting of Sc, Y, and La; Q is an element selected from the group consisting of Ti, Zr, and Ce; and z is 0≤z≤0.4.

In another embodiment, the catalytic active component is a metal solid solution represented by formula (IV)

$$La_2(C_{2-\mu}D_\mu)O_{7-1.5\mu} \quad (IV)$$

wherein C is an element selected from the group consisting of Ti, Zr, and Ce; D is an element selected from the group consisting of Co, Ni, and Cu; and µ is 0≤µ≤0.9.

The catalytic active component (III) and (IV) of the catalyst composition of the present disclosure for producing hydrogen are prepared by forming a metal solid solution in accordance with sol-gel method. First of all, a first metal source, a second metal source, and a third metal source are added into an organic solvent. Subsequently, stirring the organic solvent to form a colloidal mixture, wherein a metal of the first metal source is an element selected from the group consisting of Sc, Y, and La; a metal of the second metal source is an element selected from Ti, Zr, and Ce, the first metal source is different from the second metal source, and a metal of the third metal source is an element selected from Co, Ni, Cu, and Ru.

A surfactant is added into the mixture, the amount of the surfactant is not specifically limited. The example of the surfactant includes, but is not limited to, P123, F68, F108 and F127. The organic solvent is alcohols which can be selected from the group consisting of methanol, ethanol, butanol and isopropanol.

According to the above method, the first metal source, the second metal source, the third metal source and Ce source are added into the organic solvent based on the weighed metal nitrates or metal chlorides at different stoichiometry ratio, and the total concentration of the metal ions contained in the formed mixture is about 5 mmol. After stirring, a colloidal mixture is formed. In one embodiment, after stirring for at least 1 hour, the mixture is gelled at 40° C. for three days consecutively to form the colloidal mixture.

After that, a calcination step is operated according to the conventional method. The colloidal mixture is firstly calcined at 350° C. to 550° C., and then operating a second calcination at 800° C. to 1000° C., to form a metal solid solution. Each calcination lasts for 1 to 5 hours, preferably 5 hours.

In the present disclosure, the preparation method of the catalyst composition for producing hydrogen follows the impregnation method. The method comprises mixing the supporter represented by formula (I) with the catalytic active component or the metal precursor having a metal element with catalytic activity in the presence of solvent, and removing the solvent by heating at 80° C. to 100° C.

In one embodiment, the catalytic active component has the aforementioned pyrochlore structure, such as the metal solid solution represented by formula (II), (III) or (IV).

In another embodiment, the supporter represented by formula (I) is mixed with the metal precursor which is selected from the group consisting of metal salts, metal hydrates or metal chlorides, and the metal element with catalytic activity of the metal precursor is one or two elements selected from the group consisting of Fe, Co, Ni, Cu, Rh, Ru, Pt, Pd, and Ir.

In another embodiment, the supporter represented by formula (I) is mixed with the catalytic active component, and the solvent belongs to alcohols which can be selected from the group consisting of methanol, ethanol, butanol or isopropanol.

According to one embodiment of the aforementioned method, the supporter represented by formula (I) is mixed with the metal precursor containing the metal element with catalytic activity to form a mixture, and the preparation method further comprises calcining the mixture, such as according to the conventional method. In a non-limited embodiment, the colloidal mixture is calcined for 3 to 7 hours, preferably 5 hours, to form a metal solid solution, wherein the calcination temperature is from 200° C. to 400° C. In the embodiment, the metal element of the metal precursor is one or two elements selected from the group consisting of Fe, Co, Ni, Cu, Rh, Ru, Pt, Pd, and Ir.

EXAMPLES

The following specific examples are used for illustrating the present invention. A person skilled in the art can easily conceive the other advantages and effects of the present invention.

Synthetic Example 1: Preparation for the Supporter Having Pyrochlore Structure

The supporter $La_2Zr_2O_7$ belonging to pyrochlore structure was prepared by Pechini sol-gel method. The metal (La, Zr) nitrates were dissolved in deionized water as the precursor solution, and then in the precursor solution citric acid (CA) and ethylene glycol (EG) were added at the molar ratio of metal:citric acid (CA):ethylene glycol (EG)=1:3:4, and the solution was stirred at 100° C. to form a colloidal mixture, and the organic solvent was removed at 350° C., and the colloidal mixture was calcined at 800° C. for 5 hours to form a nano-powder of $La_2Zr_2O_7$. 10 wt % polyvinyl butyral (PVB) as pore forming agent was mixed evenly with the nano-powder, and then pressing the mixture at 8 tons of pressure to form the disc-shaped pellets. Subsequently, the disc-shaped pellets were calcined at 1600° C. for 1 hour to obtain the supporter $La_2Zr_2O_7$ by percussion and sieving in 16 to 18 mesh.

As shown in FIG. 1, the $La_2Zr_2O_7$ supporter exhibited good stability at high temperature.

Synthetic Example 2: Preparation for the Catalytic Active Component Having Pyrochlore Structure The catalytic active component was prepared according to sol-gel method. Surfactant P123 (0.5 g) was dissolved in ethanol (5 g) and then lanthanum nitrate (0.35 mol), lithium nitrate ($LiNO_3$, 0.15 mol), cerium nitrate (0.45 mol) and ruthenium chloride (0.05 mol) were added into the ethanol solution. After ultrasonic agitation and stirring for at least 1 hour, the mixture was gelled at 40° C. for three days to form a colloidal mixture. Subsequently, the surfactant was removed at 250° C. and the colloidal mixture was calcined at 900° C. for 5 hours to form a metal solid solution $La_{1.4}Li_{0.6}Ce_{1.8}Ru_{0.2}O_{7-\delta}$.

Synthetic Example 3

By impregnation method, the supporter $La_2Zr_2O_7$ prepared in synthetic example 1 was added in $Ni(NO_3)_2$ aqueous solution and mixed evenly, wherein the content of Ni was about 5 wt % compared to the weight of the supporter. The mixture was calcined at 300° C. for 5 hours to obtain the catalyst composition illustrated in Table 1.

Synthetic Example 4

By impregnation method, the catalytic active component $La_{1.4}Li_{0.6}Ce_{1.8}Ru_{0.2}O_{7-\delta}$ (about 0.1 g) prepared in synthetic example 2 was added in a solvent of ethanol (about 3 ml). After ultrasonic agitation, the supporter $\gamma$-$Al_2O_3$ was immersed in the solution. Finally, the solvent was removed at 80° C., and by repeating the steps at least 5 times, the catalyst composition $La_{1.4}Li_{0.6}Ce_{1.8}Ru_{0.2}O_{7-\delta}/\gamma$-$Al_2O_3$ was obtained as illustrated in Table 1.

Synthetic Example 5

By impregnation method, the catalytic active component $La_{1.4}Li_{0.6}Ce_{1.8}Ru_{0.2}O_{7-\delta}$ (about 0.025 g) prepared in synthetic example 2 was added in a solvent of ethanol (about 3 ml). The supporter $La_2Zr_2O_7$ was immersed in the solution. Finally, the solvent was removed at 80° C., and by repeating the steps at least 5 times, the catalyst composition $La_{1.4}Li_{0.6}Ce_{1.8}Ru_{0.2}O_{7-\delta}/La_2Zr_2O_7$ was obtained as illustrated in Table 1.

Synthetic Example 6

According to the method of synthetic example 3, Ni (5 wt %) as catalytic active component was formed on the supporter $\gamma$-$Al_2O_3$ to obtain the 5 wt % Ni/$\gamma$-$Al_2O_3$ as catalyst composition illustrated in Table 1.

Synthetic Example 7

According to the method of synthetic example 3, Ni (5 wt %) as catalytic active component and $CeO_2$ as aid agent were formed on the supporter $\gamma$-$Al_2O_3$ to obtain the 5 wt % Ni/$CeO_2$/$\gamma$-$Al_2O_3$ as catalyst composition illustrated in Table 1, wherein the weight ratio of $CeO_2$ and $\gamma$-$Al_2O_3$ is 1:10.

Synthetic Example 8

According to the method of synthetic example 3, Ni (5 wt %) as catalytic active component was formed on the supporter $ZrO_2$ to obtain the 5 wt % Ni/$ZrO_2$ as catalyst composition illustrated in Table 1.

TABLE 1

| Synthetic example | catalytic active component/aid material | supporter |
| --- | --- | --- |
| 3 | Ni | $La_2Zr_2O_7$ |
| 4 | $La_{1.4}Li_{0.6}Ce_{1.8}Ru_{0.2}O_{7-\delta}$ | $\gamma$-$Al_2O_3$ |
| 5 | $La_{1.4}Li_{0.6}Ce_{1.8}Ru_{0.2}O_{7-\delta}$ | $La_2Zr_2O_7$ |
| 6 | Ni | $\gamma$-$Al_2O_3$ |
| 7 | Ni/$CeO_2$ | $\gamma$-$Al_2O_3$ |
| 8 | Ni | $ZrO_2$ |

Test Example 1

For the 5 wt % Ni/$\gamma$-$Al_2O_3$ as catalyst composition prepared in synthetic example 6, a product analysis of the ethanol oxidative steam reformer was performed at a gas hourly space velocity (GHSV) of 160,000 $h^{-1}$ inflow air, a carbon/oxygen feeding ratio of 3:5, an ethanol/water ratio of 1:3, and a reaction temperature of 500° C., and the results were recorded in Table 2. After initiation of the reaction, due to carbon deposition in high quantity, the catalyst composition lost its activity and failed to continuously conducting long-term test.

Test Example 2

Figure 2:
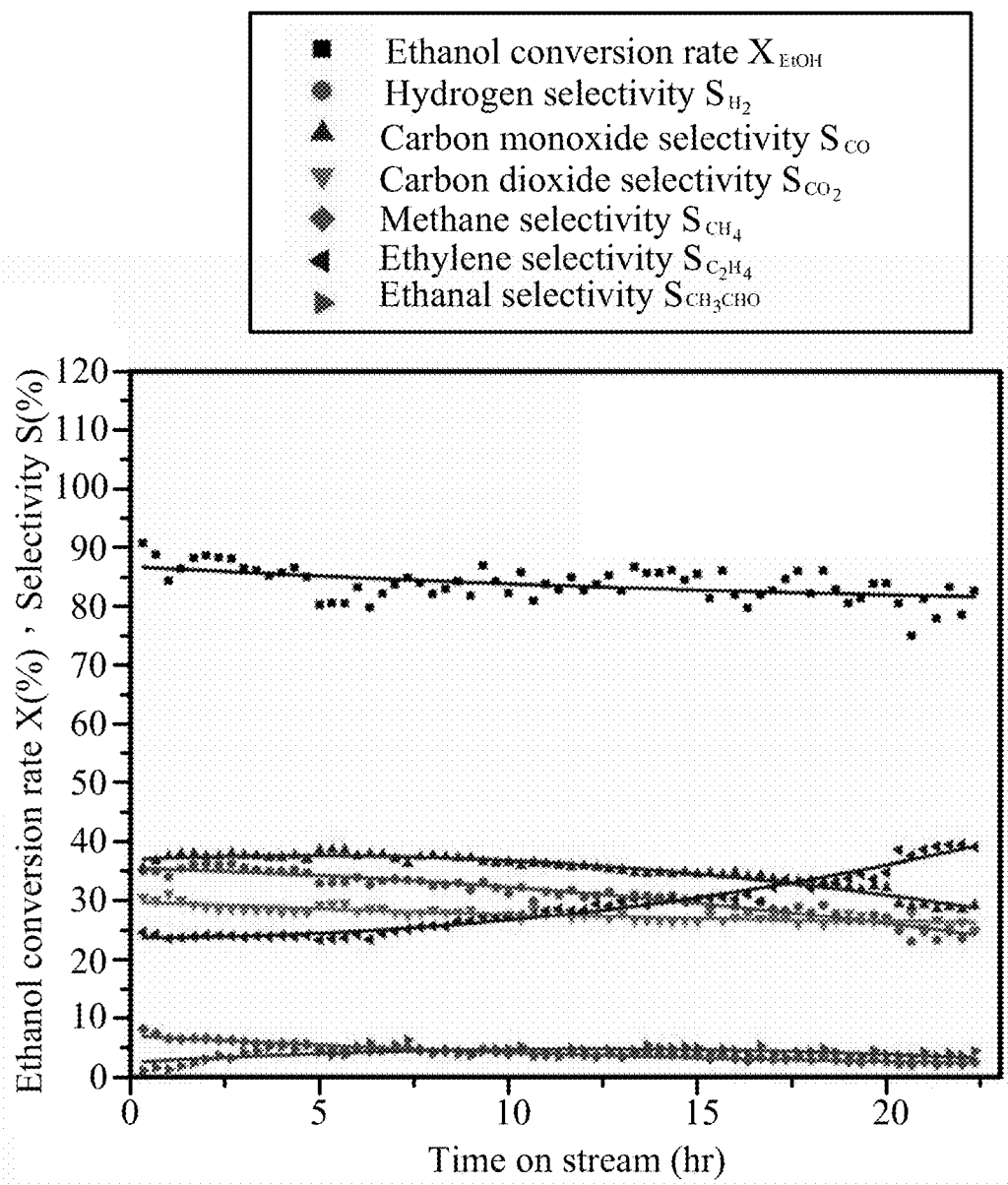
FIG. 2 shows an analysis curve diagram of time-on-stream stability of each product by using 5 wt % $Ni/CeO_2/\gamma\text{-}Al_2O_3$ as catalyst composition in ethanol reformer with carbon-to-oxygen ratio of 3:5.

For the 5 wt % Ni/$CeO_2$/$\gamma$-$Al_2O_3$ as catalyst composition prepared in synthetic example 7, a product analysis of the ethanol reformer was performed according to the condition of test example 1, and the results were recorded in Table 2. As shown in FIG. 2, after 23-hour reaction, the ethanol conversion rate reached close to 85%. In terms of hydrogen generating rate, the hydrogen selectivity decreased to 35% and carbon monoxide selectivity was 40%. After 10-hour analysis, considerable amount of carbon deposition was generated and the activity of the catalyst composition was decreased.

Test Example 3

For the 5 wt % Ni/$ZrO_2$ as catalyst composition prepared in synthetic example 8, a product analysis of the ethanol reformer was performed according to the condition of test example 1, and the results were recorded in Table 2.

Figure 3:
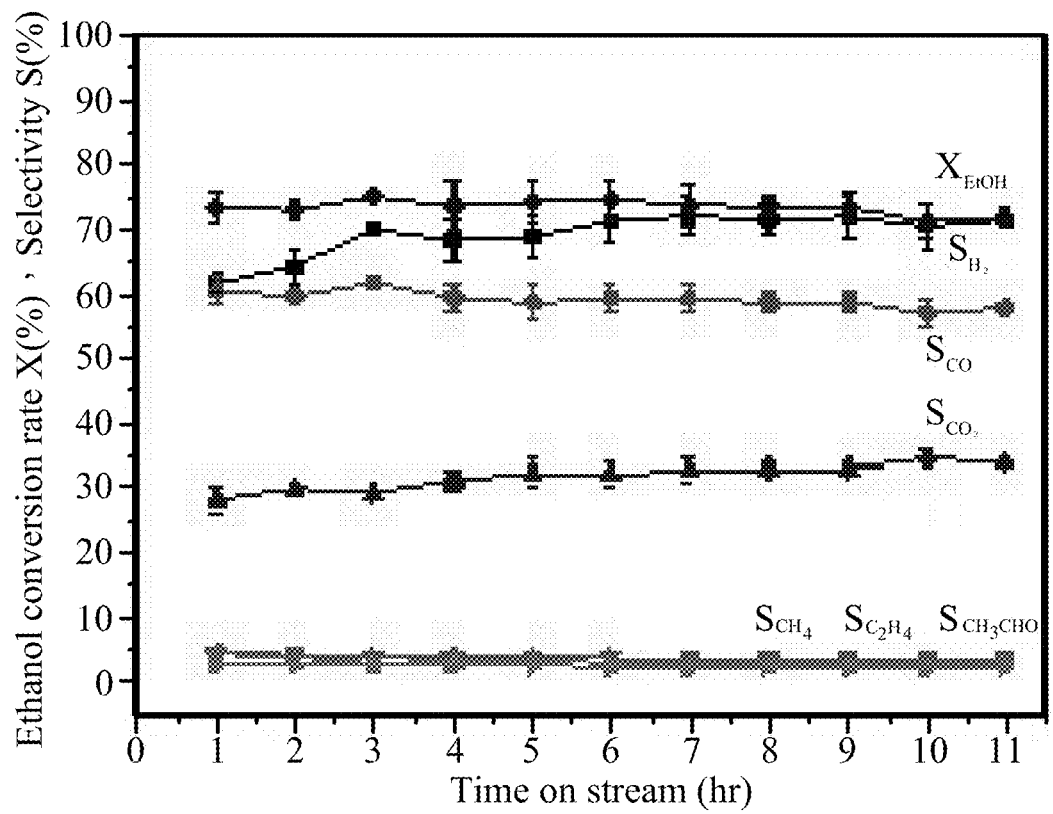
FIG. 3 shows an analysis curve diagram of time-on-stream stability of each product by using 5 wt % $Ni/ZrO_2$ as catalyst composition in ethanol reformer with carbon-to-oxygen ratio of 3:5.

FIG. 3 shows ethanol conversion rate ($X_{EtOH}$), hydrogen selectivity ($S_{H2}$), carbon monoxide selectivity ($S_{CO}$), carbon dioxide selectivity ($S_{CO2}$), methane selectivity ($S_{CH4}$), ethylene selectivity ($S_{C2H4}$) and aldehyde selectivity ($S_{CH3CHO}$).

In comparison with the catalyst composition of synthetic example 7, the catalyst composition of synthetic example 8 shows better hydrogen selectivity at 70% and carbon monoxide selectivity at 60%. After a reaction of over 10 hours, the ethanol conversion rate was maintained at 75% and no significant carbon deposition was yielded. However, under high temperature the catalyst composition of synthetic example 8 became unstable and fragile which limited its application.

Test Example 4

For the 5 wt % Ni/$La_2Zr_2O_7$ as catalyst composition prepared in synthetic example 3, a product analysis of the ethanol reformer was performed according to the condition of test example 1, and the results were recorded in Table 2.

Figure 4:
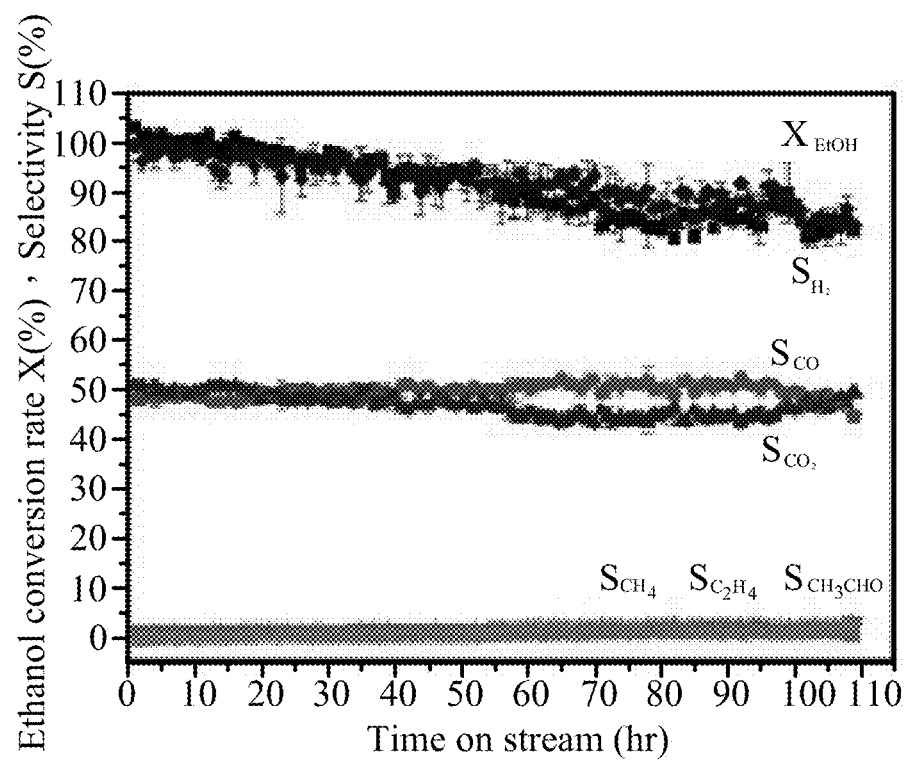
FIG. 4 shows an analysis curve diagram of time-on-stream stability of each product by using 5 wt % $Ni/La_2Zr_2O_7$ as catalyst composition in ethanol reformer with carbon-to-oxygen ratio of 3:5.

As shown in FIG. 4, the ethanol conversion rate was still maintained close to 100% after reacting for 110 hours. The hydrogen selectivity was still maintained at 80% after reacting for 80 hours and the carbon monoxide selectivity was still maintained at 50%. The catalyst composition comprising Ni having $La_2Zr_2O_7$ as supporter exhibited very good activity after reacting for 110 hours.

Test Example 5

For $La_{1.4}Li_{0.6}Ce_{1.8}Ru_{0.2}O_{7-\delta}/\gamma$-$Al_2O_3$ as catalyst composition prepared in synthetic example 4, a product analysis of the ethanol reformer was performed for 100 hours at a gas hourly space velocity (GHSV) of 160,000 $h^{-1}$ inflow air, an ethanol/water ratio of 1:3, a carbon/oxygen feeding ratio of 3:5 and a reaction temperature of 350° C., and the results were recorded in the Table 2.

Figure 5:
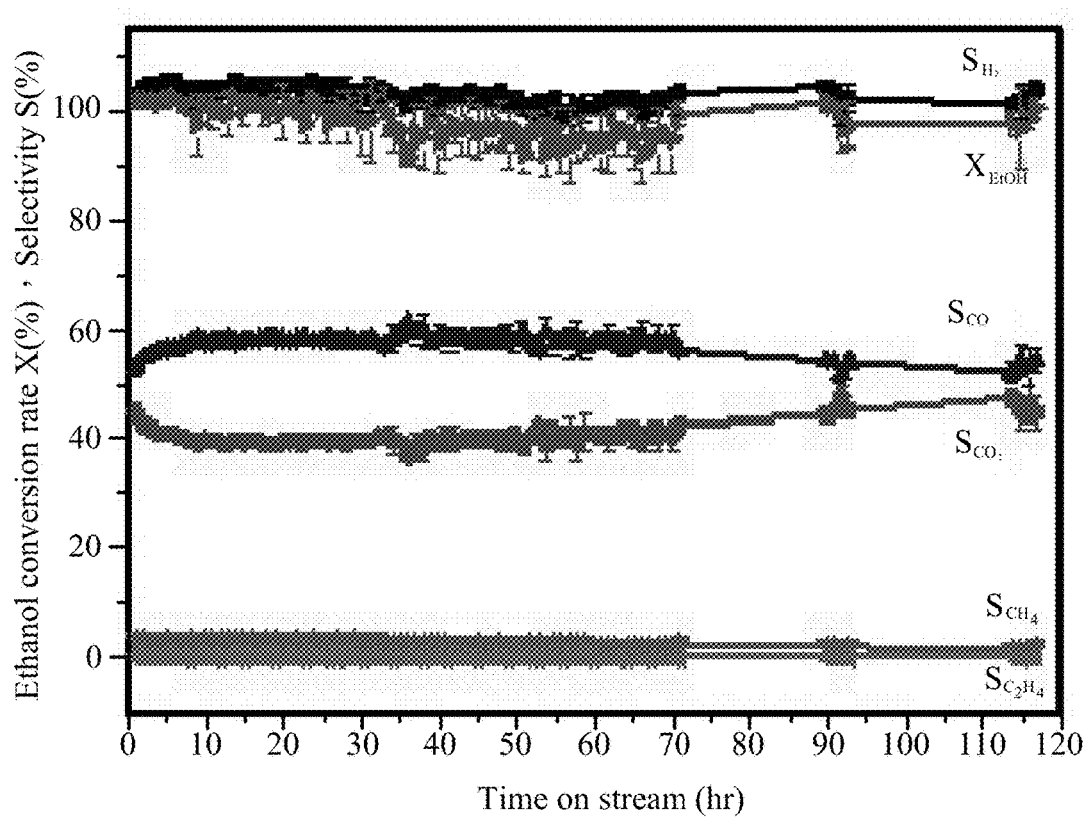
FIG. 5 shows an analysis curve diagram of time-on-stream stability of each product by using $La_{1.4}Li_{0.6}Ce_{1.8}Ru_{0.2}O_{7-\delta}/\gamma\text{-}Al_2O_3$ as catalyst composition in ethanol reformer with carbon-to-oxygen ratio of 3:5.

As shown in FIG. 5, the ethanol conversion rate is close to 100%. The gas selectivity shows good result as well, wherein the hydrogen selectivity is 100% and the carbon monoxide selectivity is 45%. The carbon deposition analysis was conducted after 100 hours of reaction.

Figure 6:
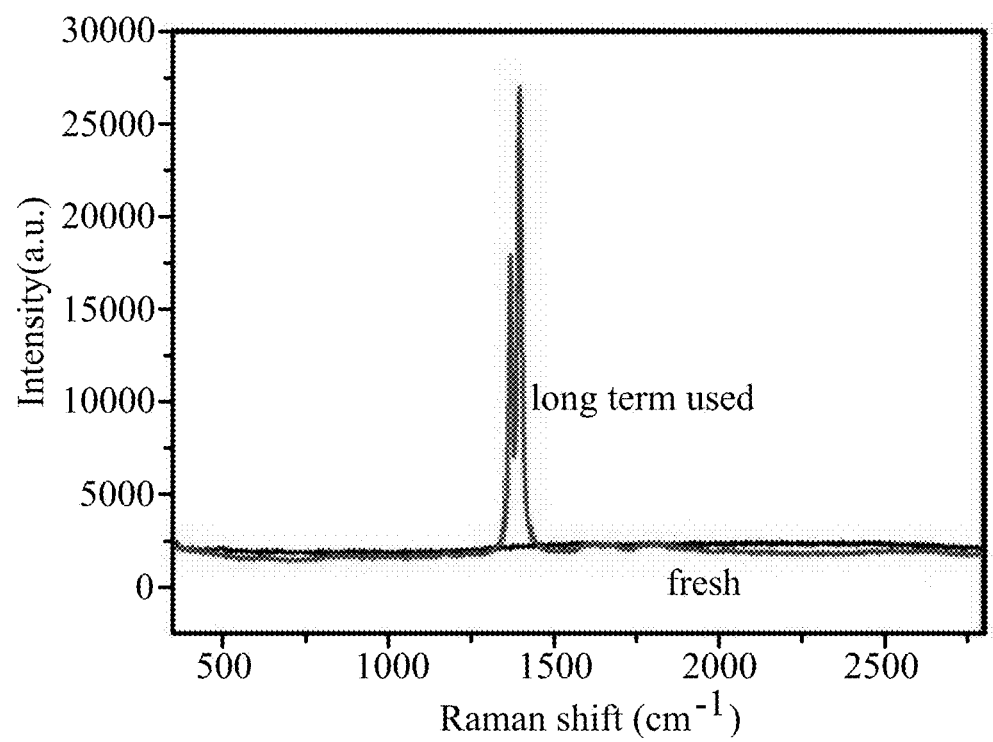
FIG. 6 shows a Raman spectrum of catalyst composition of $La_{1.4}Li_{0.6}Ce_{1.8}Ru_{0.2}O_{7-\delta}/\delta\text{-}Al_2O_3$.

After reacting around 100 hours, the Raman spectroscopy analysis was conducted and Raman wavenumber 1400 to 1500 ($cm^{-1}$) indicated the signal of carbon deposition. As shown in FIG. 6, the carbon deposition generated on catalytic active component after 100-hour reaction which resulted the gradually loss of the activity of the catalyst $La_{1.4}Li_{0.6}Ce_{1.8}Ru_{0.2}O_{7-\delta}/\gamma$-$Al_2O_3$.

Test Example 6

For $La_{1.4}Li_{0.6}Ce_{1.8}Ru_{0.2}O_{7-\delta}/La_2Zr_2O_7$ as catalyst composition, a product analysis according to the condition of test example 5 with approximately 100 hours of reaction time, and the results were recorded in Table 2.

Figure 7:
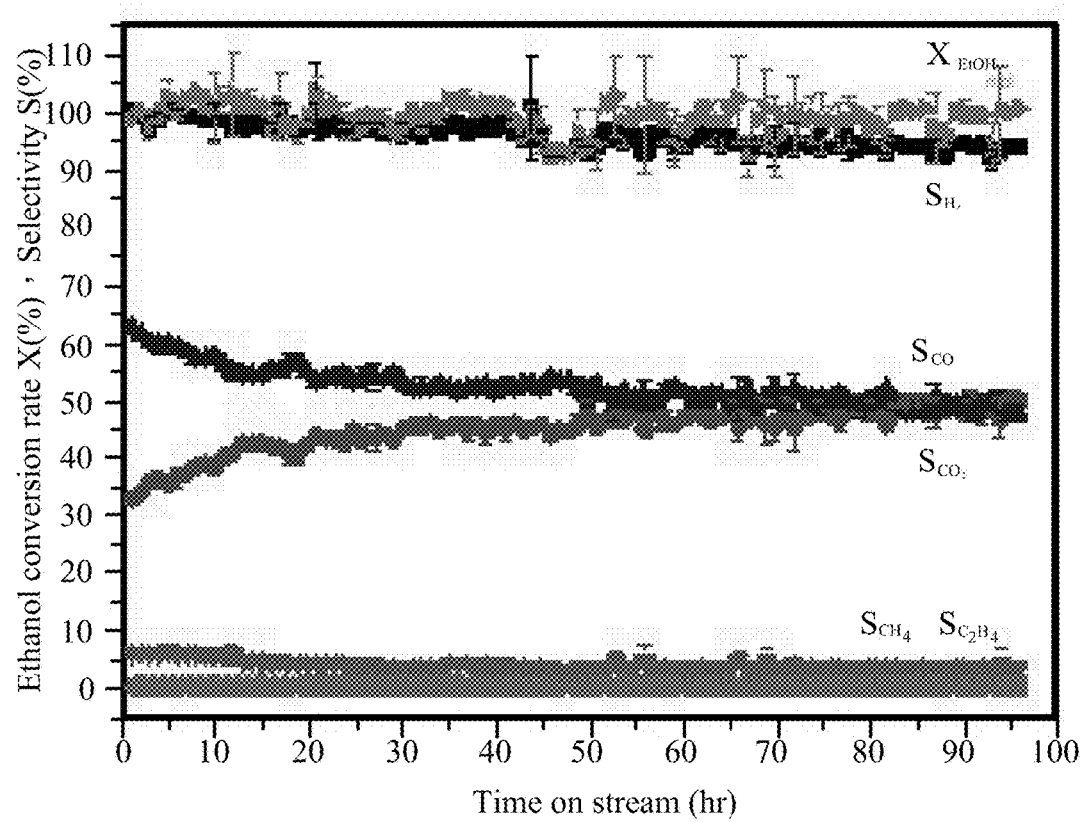
FIG. 7 shows an analysis curve diagram of time-on-stream stability of each product by using $La_{1.4}Li_{0.6}Ce_{1.8}Ru_{0.2}O_{7-\delta}/La_2Zr_2O_7$ as catalyst composition in ethanol reformer with carbon-to-oxygen ratio of 3:5.

As shown in FIG. 7, the ethanol conversion rate is still maintained close to 100%; and another 100 hours later after the reaction, it still has the best gas selectivity of hydrogen selectivity at 95% and carbon monoxide selectivity at 50%.

Figure 8:
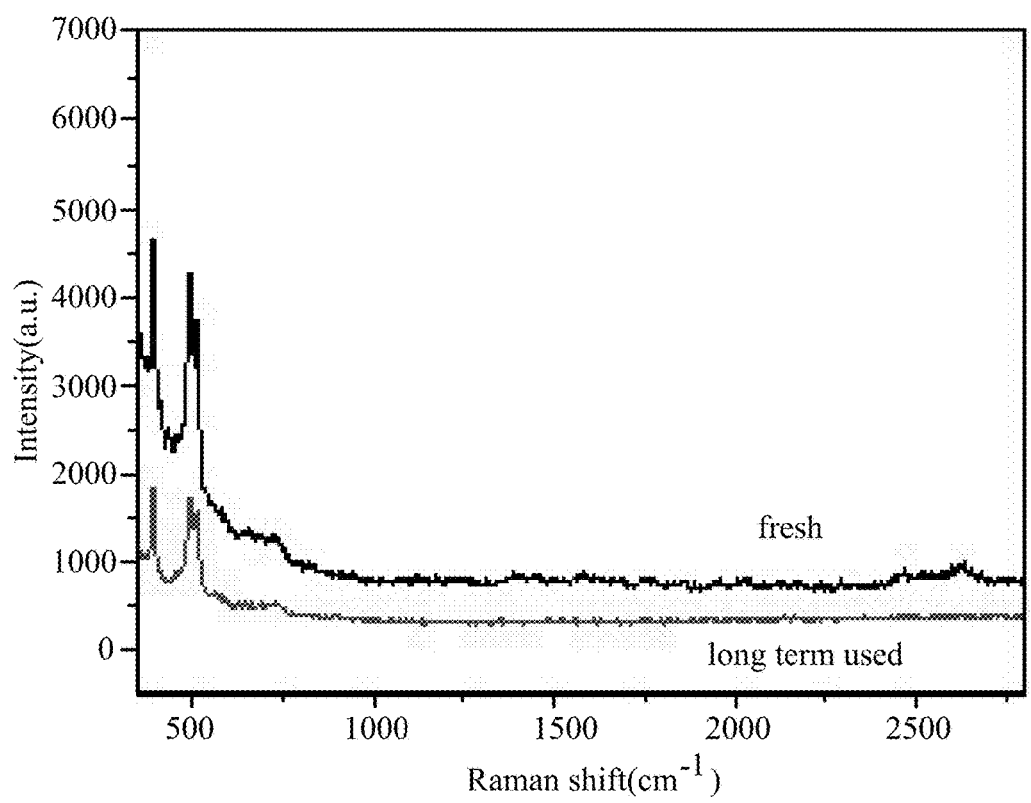
FIG. 8 shows a Raman spectrum of catalyst composition of $La_{1.4}Li_{0.6}Ce_{1.8}Ru_{0.2}O_{7-\delta}/La_2Zr_2O_7$.

After reacting around 100 hours, the Raman spectroscopy analysis was conducted and Raman wavenumber 1400 to 1500 ($cm^{-1}$) indicated the signal of carbon deposition. As shown in FIG. 8, no signal of the carbon deposition was observed after 100-hour reaction.

TABLE 2

| Test example | Catalyst composition | Reaction temperature | Ethanol conversion rate (time) | Gas selectivity $H_2$/CO | Carbon deposition |
|---|---|---|---|---|---|
| 1 | Synthetic example 6 | 500° C. | X | X | Considerable amount of carbon deposition yielded after initiation of the reaction. |
| 2 | Synthetic example 7 | 500° C. | 85% (25 hrs) | 35%/40% | At the $10^{th}$ hr, considerable amount of carbon deposition appeared. |
| 3 | Synthetic example 8 | 500° C. | 75% (11 hrs) | 70%/60% | At the $11^{th}$ hr, no significant carbon deposition yielded, and the composition shattered at high temperature and failed for test. |
| 4 | Synthetic example 3 | 500° C. | 100% (110 hrs) | 80%/50% (80 hr) | After 110 hrs, little carbon deposition |
| 5 | Synthetic example 4 | 350° C. | 100% (110 hrs) | 100%/45% | At the $100^{th}$ hr, carbon deposition appeared |
| 6 | Synthetic example 5 | 350° C. | 100% (110 hrs) | 95%/50% (100 hr) | After 100 hrs no carbon deposition |

In summary, the catalyst composition of the present invention containing a catalytic active component of non-noble metal exhibits good ethanol conversion rate. The catalyst composition containing a catalytic active component of noble metal further exhibits high hydrogen selectivity. Moreover, the byproducts (such as $CO_2$, $C_2H_4$ and $CH_3CHO$) generated from the breakage of carbon-carbon bond in the reaction can be reduced as well as the carbon deposited on the catalyst surface can be avoided, and then the life of the catalyst composition is prolonged.

What is claimed is:

1. A catalyst composition for producing hydrogen comprising:
   a catalytic active component; and
   a supporter represented by formula (I), wherein the catalytic active component is formed on the supporter, $$A_2B_2O_7 \qquad (I)$$

wherein A is an element selected from the group consisting of alkaline earth metals and Group IIIB transition metals, and B is an element selected from Group IVB metals.

2. The catalyst composition of claim 1, wherein A is the element selected from the group consisting of Ca, Sr, Ba, Sc, Y, La, Ce, Nd, Sm, Gd and Dy.

3. The catalyst composition of claim 1, wherein B is the element selected from the group consisting of Ti, Zr and Hf.

4. The catalyst composition of claim 1, wherein the catalytic active component is a metal solid solution represented by formula (II)

$$M_{2-x}M'_x(Ce_yN_{2-y})O_{7-\delta} \qquad (II)$$

wherein M is an element selected from Group IIIB metals;
   M' is an element selected from the group consisting of alkali metals, alkaline earth metals and Group IIIB metals, and M is different from M';
   N is a transition metal, and is exclusive from a Group IIIB metal or lanthanides;
   x is 0.1 to 1.0;
   y is 1.8 to 1.9; and
   δ is greater than 0 to 0.5.

5. The catalyst composition of claim 4, wherein M is the element selected from the group consisting of Sc, Y and La, and M' is the element selected from the group consisting of alkali metals, alkaline earth metals, Sc, Y and La.

6. The catalyst composition of claim 4, wherein M is La, M' is Li, and N is Ru.

7. The catalyst composition of claim 4, wherein M is La, M' is Mg or Ca, and N is Ru.

8. The catalyst composition of claim 4, wherein M is Y, M' is Sc, and N is Ru.

9. The catalyst composition of claim 4, wherein N is an element selected from the group consisting of Ru, Os, Rh, Ir and Re.

10. The catalyst composition of claim 1, wherein the catalytic active component is a metal solid solution represented by formula (III)

$$P_2(Q_{2-z}Ru_z)O_7 \qquad (III)$$

wherein P is an element selected from the group consisting of Sc, Y and La;
    Q is an element selected from the group consisting of Ti, Zr and Ce; and
    z is 0≤z≤0.4.

11. The catalyst composition of claim 1, wherein the catalytic active component is a metal solid solution represented by formula (IV)

$$La_2(C_{2-\mu}D_\mu)O_{7-1.5\mu} \qquad (IV)$$

wherein C is an element selected from the group consisting of Ti, Zr and Ce;
    D is an element selected from the group consisting of Co, Ni and Cu; and
    μ is 0≤μ≤0.9.

12. The catalyst composition of claim 1, wherein the catalytic active component is one or two elements selected from the group consisting of Fe, Co, Ni, Cu, Rh, Ru, Pt, Pd and Ir.

13. A preparation method of the catalyst composition for producing hydrogen, comprising:
    mixing a supporter represented by formula (I) with a catalytic active component or a metal precursor having a metal element with catalytic activity in the presence of solvent, $$A_2B_2O_7 \qquad (I)$$

wherein A is an element selected from the group consisting of alkaline earth metals and Group IIIB transition metals; and B is an element selected from Group IVB metals; and
    removing the solvent.

14. The method of claim 13, wherein the metal precursor is selected from the group consisting of metal salts, metal hydrates or metal chlorides, and the metal element with catalytic activity of the metal precursor is one or two elements selected from the group consisting of Fe, Co, Ni, Cu, Rh, Ru, Pt, Pd and Ir.

15. The method of claim 13, wherein the supporter represented by formula (I) is mixed with the catalytic active component, and the solvent is alcohol.

16. The method of claim 15, wherein the alcohol is selected from the group consisting of methanol, ethanol, butanol or isopropanol.

17. The method of claim 13, wherein the solvent is removed at a temperature ranging from 80 to 100° C.

18. The method of claim 13, further comprising calcining a mixture formed by mixing the supporter represented by formula (I) with the metal precessor to allow the metal element with catalytic activity to be formed on the supporter represented by formula (I), wherein the calcination temperature ranges from 200 to 400° C., and the calcination time ranges from 3 to 7 hours.

19. A method for producing hydrogen, comprising:
    (a) adding the catalyst composition of claim 1 to ethanol to form a mixture; and
    (b) carrying out oxidative seam reforming on the mixture to produce hydrogen.

* * * * *